INVENTORS.
BARUCH BERMAN
DAVID W. ROGERS
BY
ATTORNEY

INVENTORS.
BARUCH BERMAN
DAVID W. ROGERS
BY
ATTORNEY

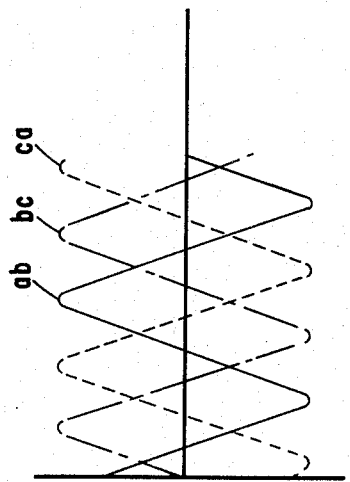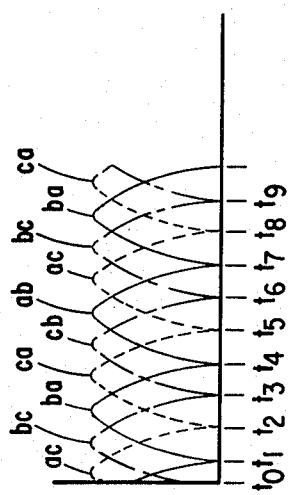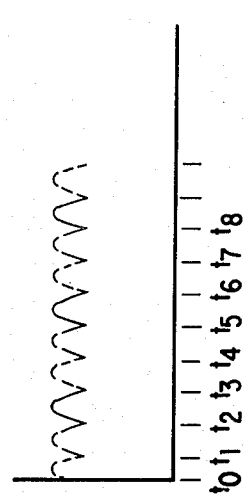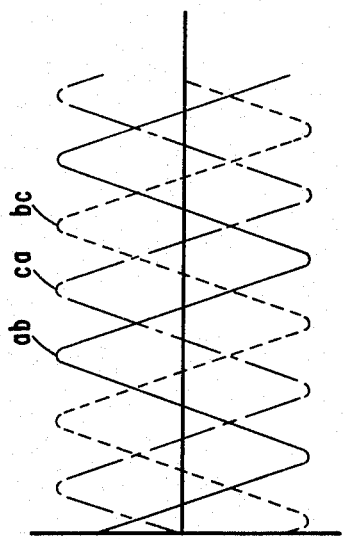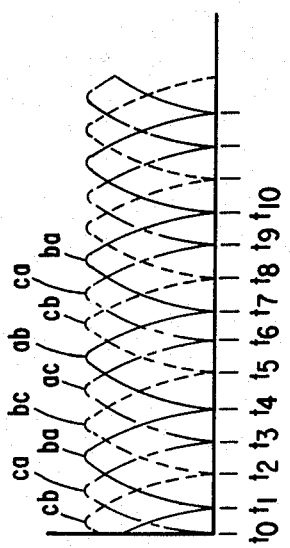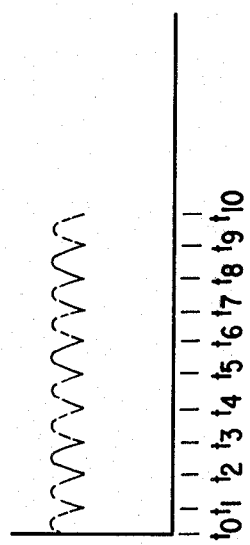

United States Patent Office 3,151,286
Patented Sept. 29, 1964

3,151,286
RECTIFYING CIRCUIT FOR POLYPHASE SOURCES
AND APPLICATION TO D.C. MOTOR CONTROL
Baruch Berman, River Vale, N.J., and David W. Rogers, New York, N.Y., assignors to ACF Industries, Incorporated, New York, N.Y., a corporation of New Jersey
Filed Jan. 24, 1961, Ser. No. 84,633
2 Claims. (Cl. 321—27)

This invention relates to the rectification of polyphase sources of electrical power and more particularly to rectification of a polyphase source by means of controlled rectifiers and a re-set type magnetic amplifier.

In the generation of controlled D.C. power from A.C. sources, there is a theoretical maximum limit on the efficiency of the conversion. For a single phase, full wave circuit, this theoretical limit is 82%. For a three-phase full wave circuit this limit is 99.7%. These efficiency figures coupled with the low ratio of peak to average current output make the three phase supply especially advantageous over single phase supply in the armature control of D.C. motors, while the increase in cost for rectifying higher phases when compared with the slight gain in efficiency makes it advantageous over the six phase and higher polyphase sources.

In controlling the amount of full wave rectified power which is applied to the load from the rated power of the three phase source, it is desirable to have a linearly variable controller with an economy of components. In prior art devices of 5 horsepower ratings and higher for full wave operation this has been accomplished with conventional magnetic amplifiers which required six output windings each rated for full power in a full wave bridge. Since these windings were connected in series in the load circuit and the impedance of the windings is difficult to control, there is a corresponding difficulty in obtaining a balanced line current over the complete control range.

A device of comparatively recent development which is capable of handling large amounts of power in relation to its size and weight is the semiconductor controlled diode. The controlled diode offers a gating action when the anode to cathode terminals are biased in the forward direction and when there is a firing potential on the control element. When the anode to cathode terminals are reverse biased, the controlled rectifier is cut off.

It is accordingly an object of this invention to provide an improved rectifying circuit to convert a source of A.C. polyphase electrical power to a D.C. output and to vary the D.C. output.

It is a further object to provide a rectifying circuit that will convert a source of A.C. polyphase electrical power to a D.C. output identical to that of a full wave bridge rectifier with an economy of control elements.

It is a still further object of this invention to provide a rectifying circuit in which the amount of D.C. power applied to a load from an A.C. polyphase source may be varied over its full range while maintaining balanced line currents.

It is a feature of this invention that the parameters of the magnetic amplifier which determine the amount of D.C. power supplied are isolated from the load.

It is an additional feature of this invention that the rectifier circuit may be used to determine the speed of D.C. motors by varying the amount of armature or field current supplied to the motor; as a lighting control, electric furnace, oven and heater control by varying the current supplied to the filaments; or as a variable power supply by varying the current through an output resistor.

These and additional objects and features are accomplished in the present invention by combining for each phase a magnetic amplifier of the re-set type to generate a variable control voltage on the control electrode of a semi-conductor controlled diode connected between each line of the polyphase source and the load and phasing the driving voltage on the magnetic amplifier with the anode to cathode voltage applied to the respective controlled diode, so that a rectified desired portion of each half cycle of the three power phases is connected in turn to the load.

The following description and drawings will give a fuller appreciation of these and other features of this invention in which:

FIG. 3A illustrates wave shapes which appear across the respective supply lines for one order of phase rotation in a three phase system.

FIG. 3B shows the wave shapes of FIG. 3A with the negative cycles rectified and appropriately labeled for clarifying the explanation.

FIG. 3C illustrates the bridge output of FIG. 1 with no delay in the magnetic amplifier.

FIG. 4A illustrates wave shapes which appear across the respective supply lines for the second order of phase rotation of a three phase system.

FIG. 4B shows the wave shapes of FIG. 3A with the negative cycles rectified and appropriately labeled for clarifying the explanation.

FIG. 4C shows the bridge output of FIG. 1 for the second order of rotation with no delay in the magnetic amplifier.

Figure 1:
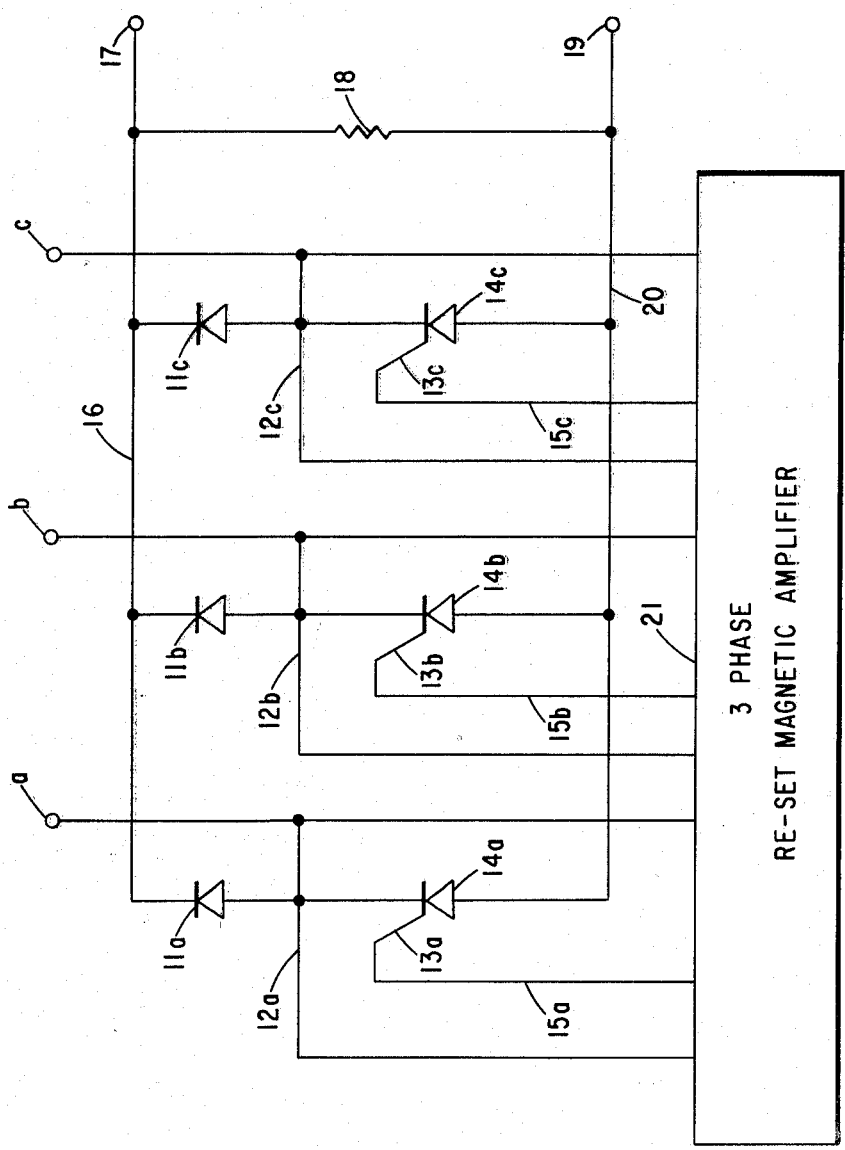
FIG. 1 is a block diagram representation of a preferred embodiment according to this invention.

FIG. 1 illustrates a 3 phase bridge having in each parallel connected arm pair, in series aiding connection, a diode such as 11a and a controlled rectifier such as 14a. The subscripts a, b, and c refer to the bridge arm pair to which the corresponding supply line a, b, or c of a three phase source of electrical power is connected between the junction of the appropriate diode and controlled rectifier. The output of the bridge is taken from terminals 17 and 19 across resistor 18 which is connected across the parallel legs of the bridge.

Controlled rectifiers 14a, 14b, and 14c are preferably semiconductor PNPN devices such as the Silicon Controlled Rectifier series manufactured by the General Electric Company although any suitable controlled rectifier may be used. These are devices which are capable of handling large amounts of power in relation to their size and weight. With reverse bias, i.e. cathode positive with respect to anode, the controlled rectifier will block the flow of current until the avalanche voltage is reached, as in the case of an ordinary diode. When forward biased, i.e., anode positive with respect to cathode, controlled rectifier will also block the flow of current until the forward breakover voltage is reached, so long as there is no signal on the control electrode. Once the controlled rectifier is in the high conduction state, the voltage from cathode to anode drops to about one volt. At forward biased anode to cathode voltages below breakover, the controlled rectifier may be fired by a small positive pulse applied from control electrode to cathode. As the control electrode voltage is increased, a critical point is reached at which the controlled rectifier will break over at any positive anode-to-cathode voltage greater than a few volts. The control electrode loses control after break over, and the rectifier can be cut off only reducing the anode voltage and current to zero.

The embodiment of FIG. 1 uses these principles to drive controlled rectified current through load resistor 18. However, in order to achieve proper operation and accurate linear control, it is necessary for the firing pulses on the control electrodes 13a, 13b, and 13c to have a precisely determined relationship with the zero crossing of the supply voltage impressed from anode to cathode across the controlled rectifiers 14a, 14b, and 14c respectively. This relationship is obtained by a novel coupling of each of the voltages across supply lines a, b, and c to drive a selected input of one of the phase sections of 3 phase re-set magnetic amplifier 21, illustrated schematically in FIG. 2, so that the corresponding output of the magnetic amplifier phase section impressed on the control electrode of a controlled rectifier is compatible with the polarity of the changing anode-to-cathode voltage, cycle by cycle.

Figure 2:
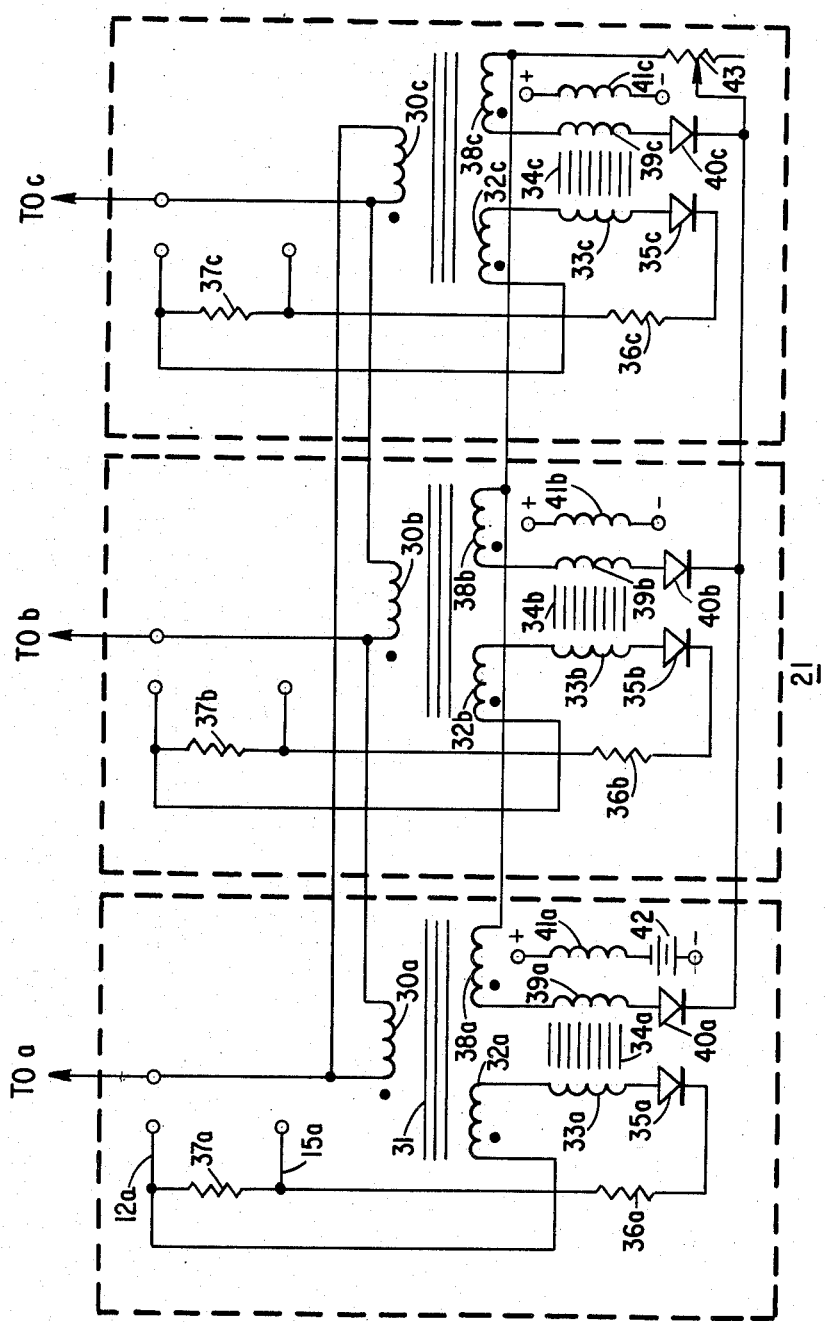
FIG. 2 is a schematic representation of the three phase re-set magnetic amplifier of FIG. 1.

Three phase re-set magnetic amplifier 21, illustrated in FIG. 2, is made up of three identical phase sections. The section on the left hand side of FIG. 2 is made up of the input primary winding 30a of transformer 31. The output secondary winding 32a of transformer 31 is in series with an output winding 33a wound around high remanence saturable magnetic core 34a, diode 35a preferably of the solid state type, current limiting resistor 36a and voltage output resistor 37a. The control secondary winding 38a of transformer 31 is in series with a control winding 39a would around the high remanence saturable magnetic core 34a, diode 40a also preferably of the solid state type, and the variable resistor 42. Also wound around saturable magnetic core 34a is a so-called M.M.F. control winding 41a, the terminals of which may be connected to a suitable variable D.C. source 42 to provide additional control.

The subscripts a, b, and c refer to corresponding elements in each phase section of re-set magnetic amplifier 21 to distinguish the elements of one phase section from another. The input primary winding 30a of transformer 31 is connected across input supply lines a and b of FIG. 1; the input primary winding 30b of transformer 31 is connected across input supply lines b and c; and the input primary winding 30c of transformer 31 is connected across input supply lines c and a.

Each phase section of the magnetic amplifier operates in the conventional manner. Thus, the instantaneous voltage difference between lines b and a is applied to transformer winding 30a and transformed to the secondary windings 32a and 38a. The dots on the secondary windings 32a and 38a, 32b and 38b, and 32c and 38c represent instantaneous polarities corresponding to the polarities indicated by the dots on the primary windings 30a, 30b, and 30c respectively. The dots do not indicate that the polarities of all three sections are as indicated at one instant of time. Thus calling the half cycle of the instantaneous voltage difference, which has transformed through winding 38a is in the forward direction through diode 40a, i.e., the dotted polarity, the demagnetizing half cycle, and the half cycle of the instantaneous voltage difference, which has transformed through winding 32a is in the forward direction through diode 35a, i.e., the reverse of the dotted polarity, the magnetizing half cycle, the circuit operates in the following manner. The demagnetizing half cycle voltage across control winding 39a produces flux lines through core 34a towards one direction of saturation of the core, but below the saturation level in that direction. The magnetizing half cycle voltage across output winding 33a produces flux lines through core 34a in opposition to the direction of the flux lines produced by the demagnetizing half cycle and toward the opposite direction of saturation. So long as the flux level on the hysteresis curve in the direction caused by the magnetizing voltage is below the saturation state for the core 34a, the impedance of output winding 33a will be high and nothing but magnetizing current will flow through resistor 37a, and the control voltage on lead 15a will not reach the firing level. However, by suitable adjustment of either the D.C. current through M.M.F. control winding 41a in a direction to oppose the flux direction produced by the demagnetizing half cycle voltage or by increasing the resistance 43 which reduces the demagnetizing half cycle voltage across control winding 39a, the flux level in core 34a can be reduced to any desired magnitude. Therefore when the magnetizing half cycle voltage is applied to the output winding 33a, there is less opposing flux to be overcome, and at some portion of the magnetizing half cycle, the core is driven to the saturation level and for the remainder of the magnetizing half cycle, the impedance of winding 33a is low and output current flows through resistor 37a to produce a firing voltage on the control electrode of controlled rectifier 14a.

FIGS. 3A and 3B explain in terms of voltage waveforms how a rectified linear bridge output is obtained. The peak voltages shown are all below the forward breakover voltage of the controlled rectifier. The supply lines a, b, and c are connected to the bridge with respect to phase rotation so that line a is first positive with respect to b, then line c is positive with respect to line a, and then line b is positive with respect to line c. These instantaneous voltage waveforms are shown in FIG. 3A. The notation used to identify the wave forms is that the line represented by the first letter is positive with respect to the second, thus ab refers to the fact that the voltage of line a is positive with respect to the voltage of line b. In order to simplify the following explanation, all of the negative cycles of FIG. 3A are rectified and shown with the positive cycles in FIG. 3B. To keep polarities consistent with the notation of FIG. 3A requires reversing the letters of the negative half-cycles when shown positively.

Now considering the first controlled rectifier 14a in FIG. 1, it will be forward biased when line c is positive with respect to line a and when line b is positive with respect to line a. However, with the anode to cathode peak voltage below the forward breakover voltage, the controlled rectifier will not break into the high conduction state until there is a positive firing voltage on the control electrode. Considering FIG. 3B as it applies to controlled rectifier 14a of FIG. 1, t0 represents the first instant of time at which controlled rectifier 14a becomes forward biased as the voltage of line c goes positive with respect to the voltage of line a. Controlled rectifier 14a will not conduct, however, until the voltage on control electrode 13a goes positive. From FIG. 2, this control electrode voltage is a function of ba which first becomes positive at time t1. Controlled rectifier 14a first fires at some point after time t1 along the positively rising curve ba as described later. The conduction path is from line c through the series combination of diode 11c, load resistor 18 and anode to cathode of controlled rectifier 14a to line a. When diode 11c conducts, its voltage drop is negligible and the voltage along conductor 16 is effectively the voltage of line c. From t1 to t2 the voltage of line c is positive with respect to line b. Therefore diode 11b is reverse biased and cut off. When controlled rectifier 14a is in the high conduction state, its voltage drop is negligible and the voltage along conductor 20 is effectively at the voltage of line a. At t2 the voltage of line b goes positive with respect to the voltage of line c. Therefore diode 11b becomes forward biased, and since at t2 line b is also positive with respect to line a, conduction starts from line b through the series combination of diode 11b, load resistor 18, and anode to cathode of controlled rectifier 14a to line a. When diode 11b conducts, its voltage drop is negligible and the voltage along conductor 16 rises to the voltage of line *b* which puts reverse bias on diode 11*c* thus cutting it off and in so doing cuts off conduction from line *c*. From *t*2 to *t*3 conduction continues from line *b* to line *a*. If there is no delay in the firing pulse on gate 13*c*, *t*3 is the time when both the anode to cathode voltage *bc* less a voltage drop and the control electrode voltage *ac* less a voltage drop on controlled rectifier 14*c* become positive, hence it is the firing point of controlled rectifier 14*c*. It is also the time when the voltage *ac* goes through zero. As soon as controlled rectifier 14*c* fires, the cathode to anode voltage drop becomes negligible and conductor 20 is at the voltage of line *c*. Since the cathode of controlled rectifier 14*a* is at the potential of line *a* which after *t*3 is positive with respect to line *c*, controlled rectifier 14*a* is reverse biased and cut off.

The conduction interval of controlled rectifier 14*c* is from time *t*3 to *t*5. At *t*5 controlled rectifier 14*b* fires when its anode to cathode voltage *ab* less a voltage drop and its control electrode voltage *cb* less a voltage drop become positive. When controlled rectifier 14*b* fires, the anode of controlled rectifier 14*c* drops to the voltage of line *b* and since the cathode of controlled rectifier 14*c* is at the voltage of line *c* and FIG. 3B shows *cb* positive at time *t*5, 14*c* is cut off.

The conduction interval of controlled rectifier 14*b* is from *t*5 to *t*7. At *t*7 controlled rectifier 14*a* fires again when its anode to cathode voltage *ca* less a voltage drop and its gate voltage *ba* less a voltage drop become positive. When controlled rectifier 14*a* fires, the anode of controlled rectifier 14*a* drops to the voltage of line *a* because of the negligible resistance of 14*a* in its high conduction state and since the cathode of controlled rectifier 14*b* is at the voltage of line *b* and FIG. 3B shows *ba* positive at time *t*7, 14*b* is cut off. This repeats over and over again. From this analysis it can be seen that the time at which controlled rectifier 14*a* last previously fired was at *t*2.

FIG. 3C shows the rectified output across the terminals 17 and 19 at full power as described above. The conduction interval is 120 degrees for each controlled rectifier.

For control purposes using this order of phase rotation, the control electrode firing voltage can be delayed behind the start of the magnetizing half cycle anywhere up to the full 180 degrees. Looking at FIG. 2, each of the control winding circuits with their respective control windings 38*a*, 38*b*, and 38*c* are shown connected in parallel to variable resistance 43. Since the control winding circuits in each phase section are balanced, any one setting of variable resistor 43 and its corresponding voltage drop will produce the same demagnetizing flux level or re-set in each of cores 34*a*, 34*b*, and 34*c*. The same thing is true of a properly polarized D.C. voltage such as 42 applied to the parallel connected M.M.F. windings 41*a*, 41*b* and 41*c*. By increasing the re-set level, the same magnetizing flux will have more demagnetizing flux to overcome and the core will not be saturated until some increasingly delayed point in the magnetizing half cycle, when output current through resistor 37*a*, 37*b* or 37*c* will fire the corresponding controlled rectifier. So long as the control windings and associated components in each phase section of re-set magnetic amplifier 21 are balanced, the firing voltage on each of the control electrodes of controlled rectifiers 14*a*, 14*b*, and 14*c* will be delayed behind the respective anode to cathode voltage for that controlled rectifier by the same angle.

Figure 3D:
FIG. 3D illustrates the bridge output of FIG. 1 with a delay of ten degrees in the magnetic amplifier.

FIG. 3D shows the bridge output with each control electrode firing voltage delayed 10 degrees behind the start of the corresponding positive anode to cathode voltage. Note that the conduction interval is still 120 degrees. While the first controlled rectifier starts firing 10 degrees later, the succeeding controlled rectifier which cuts off the first one also fires 10 degrees later, and the conduction interval remains the same. The output voltage here is 250 volts D.C.

Figure 3E:
FIG. 3E illustrates the bridge output of FIG. 1 with a delay of sixty degrees in the magnetic amplifier.

FIG. 3E shows the bridge output with a delay of 60 degrees. The output voltage has dropped to 190 volts D.C. due to the loss of area under the voltage waveforms. This is the maximum delay at which the conduction interval will remain 120 degrees. Looking at FIG. 3B as it applies to controlled rectifier 14*a*, shows that the anode to cathode voltage becomes reverse biased at time *t*4 as line *a* is positive with respect to both lines *b* and *c*. Hence, conduction of controlled rectifier 14*a* cannot continue past time *t*4.

Figure 3F:
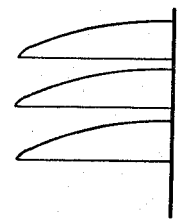
FIG. 3F illustrates the bridge output of FIG. 1 with a delay of ninety degrees in the magnetic amplifier.

FIG. 3F shows the bridge output with a delay of 90 degrees. The output voltage is 120 volts D.C. and the conduction interval is 90 degrees.

Figure 3G:
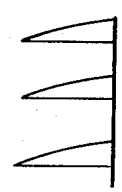
FIG. 3G illustrates the bridge output of FIG. 1 with a delay of one hundred twenty degrees in the magnetic amplifier.

FIG. 3G shows the bridge output with a delay of 120 degrees. The output voltage is 40 volts D.C. and the conduction interval is 60 degrees.

If the magnetic control is delayed further with respect to the positive going zero crossing of the anode to cathode voltage, the conduction interval will become progressively smaller until the point of zero output is reached. The foregoing explanation illustrates how this circuit successfully controls the output power from zero to maximum while retaining the advantages of three phase full wave rectification.

It should be noted that while the embodiment of the invention illustrated has been described for an identical re-set voltage applied to each core 34*a*, 34*b*, and 34*c* in turn by means of variation in adjustable resistor 43 to obtain a symmetrical output in each phase, the invention is not limited to a symmetrical output.

An alternative method of control is to use three separate variable resistors in series with each of diodes 40*a*, 40*b*, and 40*c*. This connection has the advantage of allowing the independent adjustment of the conduction duration and output of each of the controlled rectifiers 14*a*, 14*b*, and 14*c*. Independent adjustment may also be obtained by connecting an individual source of D.C. voltage to each M.M.F. winding 41*a*, 41*b* and 41*c*.

Still a third method of control would be to connect the three control windings 38*a*, 38*b*, and 38*c* in series with an adjustable resistor for control.

This may also be achieved by connecting the three M.M.F. windings 41*a*, 41*b*, and 41*c* in series instead of in parallel as shown in FIG. 2 and applying a variable D.C. current through them as well. This method has the advantage of allowing control from a D.C. signal source. Other methods of control can be readily contrived without departing from the spirit of the invention.

In one embodiment of this invention for a 7½ horsepower motor control system, a maximum output identical with that of a full wave rectifier was obtained over a control range from this maximum to zero power output while maintaining line currents balanced to within 5%.

It can be observed from FIG. 3B that the proper actuating voltage for the magnetic cores 34*a*, 34*b*, and 34*c* of magnetic amplifier 21 is the second phase in point of time through which each controlled rectifier conducts. Thus for controlled rectifier 14*a*, which conducts from *t*1 through *t*3, it conducts first from phase *c* through *a*, and then from phase *b* through *a*. Hence the proper actuating voltage for the magnetic core 34*a* is *ba*. These voltages are preferably obtained from a delta-Y connected transformer 31, although an individual transformer may be obtained from each phase.

It should be noted that the phase rotation must be carefully selected to obtain linear control over the entire output. There are only two possible orders of rotation in a three phase system. If instead of the order of rotation shown in FIG. 3A, i.e., *ab*, *ca*, *bc*, the order is *ab*, *bc*, *ca*, the three phase voltages for the new order of rotation are shown in FIG. 4A with the rectified cycles shown in FIG. 4B. Now considering controlled rectifier 14*a* of FIG. 1, in conjunction with FIG. 4B, for the condition where there is no delay of the firing pulse in magnetic amplifier 21, controlled rectifier 14a is simultaneously forward biased and has a positive voltage on its control electrode 13a at time t2. Hence, it conducts from line b through rectifier 11b, load resistor 18, and controlled rectifier 14a to line a. When rectifier 11b conducts, its voltage drop is negligible and the voltage along conductor 16 is effectively the voltage of line b. From t2 to t3, the voltage of line b is positive with respect to the voltage of line c. Therefore, diode 11c is reverse biased and cannot conduct. When controlled rectifier 14a is in the high conduction state, its voltage drop is negligible and the voltage along conductor 20 is effectively at the voltage of line a. At t3 line c becomes positive with respect to line b so diode 11c is forward biased and controlled rectifier 14a continues firing from line c, the path being line c, through the series combination of diode 11c, load resistor 18 and anode to cathode of controlled rectifier 14a to line a. When diode 11c conducts, because of its negligible voltage drop, conductor 16 is effectively at voltage c which being positive with respect to b cuts off diode 11b, and controlled rectifier 14a no longer conducts through line b. Although at t3 the positive voltage from line c to line b is the firing voltage for controlled rectifier 14b, conductor 20 is effectively at the potential of line a and from t3 to t4 line b is positive with respect to line a, so controlled rectifier 14b is reverse biased and will not conduct. At t4 the voltage of line a, effectively the voltage on conductor 20, becomes positive with respect to the voltage of line b, so controlled rectifier 14b is forward biased and the control electrode voltage, a function of cb being positive, controlled rectifier 14b fires from line c through to line b. As controlled rectifier 14b is in its high conduction state, its voltage drop is negligible and the voltage on conductor 20 goes from the line a voltage to the line b voltage. This puts reverse bias on controlled rectifier 14a and cuts it off. From t4 to t5 the voltage of line c remains positive with respect to line a, so conductor 16 being effectively at the voltage of line c, diode 11a is reverse biased. At t5, however, the polarities reverse, diode 11a is forward biased and conducts. After conduction, the cathode of diode 11a and conductor 16 are at the voltage of line a. This puts reverse bias on diode 11c and cuts it off, so controlled rectifier 14b from t5 to t6 conducts from line a through to line b. At t6 the voltage of line b, effectively the voltage on conductor 20 becomes positive with respect to the voltage on line c, and controlled rectifier 14c is forward biased. Since the control electrode voltage for controlled rectifier 14c is a function of the voltage between lines a and c and ac is shown becoming positive at t6, controlled rectifier 14c fires at time t6. In the high conduction state of controlled rectifier 14c, the voltage on conductor 20 drops to the voltage of line c. Since from t6 to t7 each of the potentials of lines a and b are positive with respect to the potential of line c, controlled rectifier 14b is cut off and controlled rectifier 14a is reverse biased. Conduction continues through the bridge output from line a to line c. At t7 the voltage of line b becomes positive with respect to line a, the existing voltage on conductor 16, so diode 11b is forward biased and conducts, which effectively puts conductor 16 at the voltage of line b and thereby cuts off diode 11a. Conduction from t7 to t8 therefore takes place from line b through controlled rectifier 14c to line c. At t8, the voltage of line c which is the level of conductor 20 goes positive with respect to line a which in turn forward biases controlled rectifier 14a. Since the voltage ba which is the triggering voltage on control electrode 13a of rectifier 14a is positive, controlled rectifier 14a fires putting conductor 20 at the voltage of line a which cuts off controlled rectifier 14c. This process repeats cycle by cycle.

FIG. 4C shows the rectified output across terminals 17 and 19 at full power as described above for the second order of phase rotation. The conduction interval is 120 degrees for each rectifier. It should be noted that the proper actuating voltage for the magnetic cores 34a, 34b and 34c of magnetic amplifier 21 is now the first phase in point of time through which each controlled rectifier conducts instead of the second phase. This limits the degree of control which can be obtained over the bridge output. This can be best illustrated by comparing FIGS. 3B and 4B as they apply to controlled rectifier 14a. The firing point for controlled rectifier 14a is t1 for phase rotation ab, ca, bc in FIG. 3B. For equal delays in each phase section of magnetic amplifier 21, the firing pulse ba can be delayed from t1 to t4 or 180 degrees and an output will be obtained through controlled rectifier 14a. The firing point for controlled rectifier 14a for phase rotation ab, bc, ca in FIG. 4B is t2. The firing pulse ba is not effective before the time t2 because until that time controlled rectifier 14a is reverse biased. Therefore, assuming equal delays in each phase section of magnetic amplifier 21, the firing point of controlled rectifier 14a can only be delayed from t2 to t4 or 120 degrees to obtain an output, because after t4 there is no triggering voltage available. For the second order of phase rotation delays of 10 degrees will produce a bridge output corresponding to FIG. 3D, delays of 60 degrees, 90 degrees, and 120 degrees will produce bridge outputs corresponding to FIGS. 3E, 3F, and 3G respectively. However, there will be no output if the triggering pulse is delayed any further, while for phase rotation in the order ab, ca, bc, the output will linearly decrease to zero over an additional 60 degrees of delay.

Figure 5:
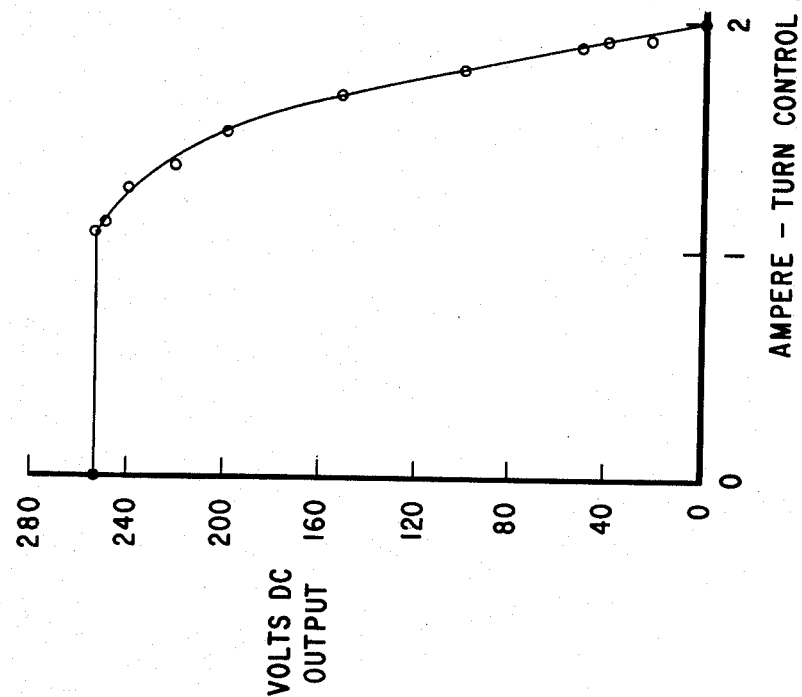
FIG. 5 shows a graph of output voltage versus control signal of the invention for the first order of phase rotation.

FIG. 5 shows a graph of output voltage vs. control signal for the embodiment of the present invention using the first order of phase rotation.

Although described for three phase operation, the invention may be employed with two phase, six phase and higher phases by employing a corresponding number of bridge arms and magnetic amplifier phase sections.

It should be understood that a preferred embodiment of the present invention has been described using specific terms and examples but using them in a generic and descriptive sense and not for purposes of limitation, as the scope of the invention is set forth in the following claims.

What is claimed is:

1. Circuitry for controlling power to a load comprising a polyphase source of electrical power; a load; a rectifying network connected to said load and having a plurality of pairs of arms, each arm pair including a rectifier and a semiconductor controlled rectifier in series aiding connection, each controlled rectifier having a control electrode to put said controlled rectifier and said rectifying network in a highly conductive state when a positive voltage is applied to said electrode and when said controlled rectifier is positively biased; a re-set magnetic amplifier with a plurality of phase sections corresponding to the phases of said source and having for each phase section a high remanence core and three separate windings thereon, an input circuit including one of said windings, an output circuit including another of said windings connected to said control electrode, and a control circuit means in the input circuit for controlling the output voltage of said output circuit and thereby the amount of power passing from said source to said load; means connected to the third windings for adjusting the outputs of all phase sections in unison, and means for connecting each phase of said source to a point between a series connected rectifier and controlled rectifier and to the input of that magnetic amplifier phase section connected to the control electrode of the controlled rectifier to which said phase is connected.

2. A rectifying circuit comprising three phase current source connections, a three phase transformer connected to said three phase connections and having a pair of secondary windings in each phase section thereof, a three phase re-set magnetic amplifier having in each phase section an input circuit including a first magnetic amplifier winding connected across one secondary winding and an output circuit including a second magnetic amplifier winding connected across the other secondary winding of a pair, means in the input circuit of each phase section of the amplifier for adjusting the magnitude of the output thereof, means including a magnetic bias winding in each phase section and a current source connected to the bias windings for biasing the three phase sections of the magnetic amplifier, a direct current output circuit having three parallel branches each including a rectifier and a controlled semiconductor rectifier connected in series, each controlled rectifier having a control electrode connected to the output circuit of a given phase of the magnetic amplifier and a connection from the junction of each rectifier and controlled rectifier to the current source connection of said given phase.

References Cited in the file of this patent

UNITED STATES PATENTS

| | | |
|---|---|---|
| 2,925,546 | Berman | Feb. 16, 1960 |
| 2,986,692 | Fischer | May 30, 1961 |
| 2,989,676 | Fischer | June 20, 1961 |

OTHER REFERENCES

"Magnetic Amplifier Triggers Silicon Controlled Rectifier"; published by Electrical Design News (June, 1959); pages 20 and 21 relied on.

"Controlled Rectifiers Driver A.-C. and D.-C. Motors," by Seegmiller, published by Electronics (Nov. 13, 1959); pages 73–75 relied on.